J. T. MACK.
SCRAPER FOR FORKS.
APPLICATION FILED NOV. 21, 1911.
1,016,696.
Patented Feb. 6, 1912.
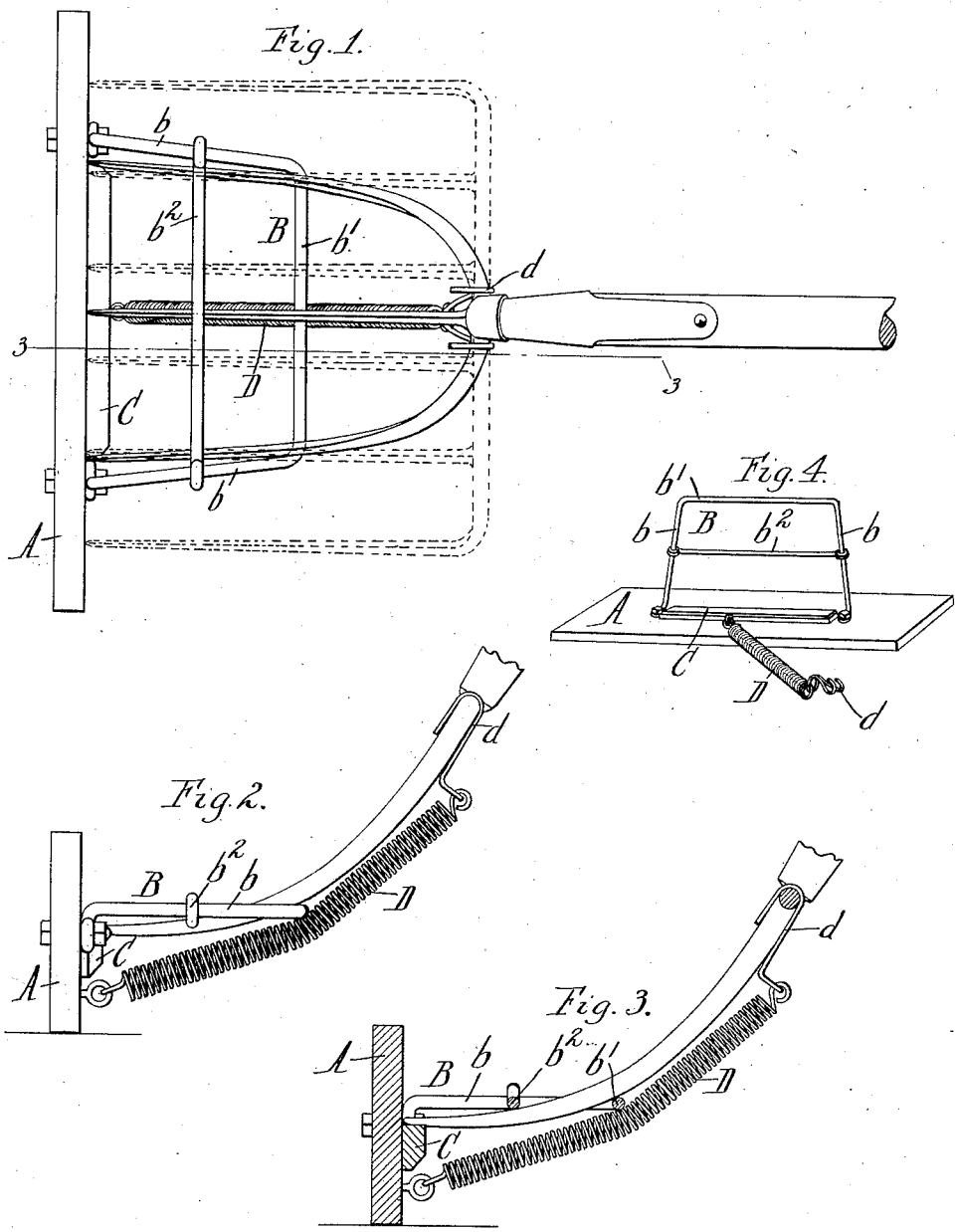
Witnesses:—
Inventor
James T. Mack
by Wilhelm, Rickert and
Attorneys.

UNITED STATES PATENT OFFICE.

JAMES T. MACK, OF BUFFALO, NEW YORK.

SCRAPER FOR FORKS.

1,016,696.  Specification of Letters Patent.  Patented Feb. 6, 1912.

Application filed November 21, 1911. Serial No. 661,495.

*To all whom it may concern:*

Be it known that I, JAMES T. MACK, a citizen of the United States, residing at Buffalo, in the county of Erie and State of New York, have invented a new and useful Improvement in Scrapers for Forks, of which the following is a specification.

This invention relates to detachable scrapers which are adapted to be detachably secured to forks and similar implements so that the fork or other implement will form an operating handle for the scraper.

The object of this invention is to provide a simple and effective scraper of this type, which is so constructed that it can be readily and firmly attached to the fork and used for scraping purposes, and which is adapted to be attached to forks of the different sizes commonly used having different numbers of tines.

In the accompanying drawings: Figure 1 is a fragmentary plan view of a scraper embodying the invention and of a fork to which the scraper is attached. Fig. 2 is a fragmentary side elevation thereof. Fig. 3 is a sectional elevation in line 3—3, Fig. 1. Fig. 4 is a perspective view of the scraper with the fork removed.

Like reference characters refer to like parts in the several figures.

The device comprises a scraper blade A which is usually made of wood, or some suitable light material, and which is preferably of rectangular shape. On its rear face the scraper blade A is provided with means for attaching it to the fork or other implement to which it is to be secured and which is to form the handle therefor. This means comprises a substantially U-shaped attaching member B, which projects rearwardly from the scraper blade, and consists of legs $b$ which are bolted or otherwise suitably secured, at their inner ends, to the scraper blade, and are connected together at their outer ends by a cross-bar $b'$ preferably integral therewith. Intermediate of their ends the legs $b$ are connected together by an intermediate cross-bar $b^2$ which is suitably secured at its ends to these legs and preferably lies in the same plane with the legs and the cross-bar $b'$. The tines of the fork are adapted to be inserted between the outer cross-bar $b'$ and the intermediate cross-bar $b^2$, passing over the outer cross-bar and under the intermediate cross-bar, and bearing against these cross-bars with their ends preferably in engagement with the rear face of the scraper blade. Any suitable stop or bearing may be provided for the end portions of the tines to hold the tines in engagement with the cross-bars $b'$ and $b^2$ and prevent the tines from swinging thereon. In the construction shown, a bearing strip C, of wood, is employed for this purpose, which is suitably secured to the rear face of the scraper blade and is adapted to engage the end portions of the tines on their underside when the fork is in position on the scraper. The cross-bar $b'$ and the strip C form bearings for the underside of the tines, and the cross-bar $b^2$ forms a central bearing for the upper side thereof. The construction thus forms a strong and stiff connection between the fork and the scraper blade.

Any suitable means may be employed for retaining the fork in engagement with the attaching member B. In the construction shown, a coil spring D is employed which is suitably secured at one end to the scraper blade and is provided at its opposite end with a forked hook $d$ which is adapted to detachably engage the head of the fork at opposite sides of the handle portion thereof. This spring retains the fork in engagement with the attaching device and can be readily attached to and detached from the head of the fork and the fork can thus be quickly secured in and removed from the attaching device as may be desired.

In the construction shown in Figs. 1, 2 and 3, the scraper is represented as being attached to the usual three-tined fork and the width of the attaching member B is such as to permit the insertion of the three tines of this fork between the legs $b$ with the outer edges of the outer tines in close proximity to the legs $b$ so that these legs will oppose any lateral or sidewise movement of the fork when in position in the attaching device. The attaching device is not limited, however, in its application to three-tined forks but is adapted to be used with forks having a different number of tines, for example, its use with the usual six tined fork is shown in dotted lines in Fig. 1, in which the four central tines are secured in the attaching device between the legs $b$ while the outermost tines of the fork stand outside of the attaching device. In this construction it will be noticed that the legs of the attaching device prevent lateral movement of the fork and scraper blade relative to each other.

The scraper is of simple and inexpensive construction and can be quickly attached to and detached from the fork or other implement with which it is to be used, and when attached thereto will be firmly and securely held in place so as to withstand all strains to which a scraper is normally subjected in use and permit the scraper to be as effectively used for scraping purposes as a construction in which the handle is rigid with the scraper blade.

I claim as my invention:

1. A detachable scraper for forks and similar implements comprising a scraper blade and means for detachably securing said scraper blade to the fork consisting of outer, intermediate and inner bearing members between which the tines of the fork are adapted to be inserted and with which they are adapted to engage, means for securing said bearing members to said scraper blade, and means for detachably holding said tines in engagement with said bearing members, substantially as set forth.

2. A detachable scraper for forks comprising a scraper blade, an attaching device secured to said blade and having spaced bearing portions between which the tines of the fork are adapted to be inserted, means on said blade adapted to engage the end portions of the tines to prevent the tines from being swung out of engagement with said bearing portions, and means for detachably holding said fork in engagement with said attaching device, substantially as set forth.

3. A detachable scraper for forks comprising a scraper blade, an attaching device secured to said blade and having spaced bearing portions between which the tines of the fork are adapted to be inserted, and supporting legs for said bearing portions which are adapted to engage said tines and prevent lateral movement of said fork relative to said blade, a bearing member secured to said blade and adapted to engage the end portions of the tines, and means for detachably holding said fork in engagement with said attaching device, substantially as set forth.

4. A detachable scraper for forks comprising a scraper blade, a substantially U-shaped attaching device secured to said blade and having outer and intermediate cross-bars between which the tines of the fork are adapted to be inserted, means secured to said scraper blade and adapted to engage the end portions of said tines to prevent said tines from being swung out of engagement with said cross-bars, and means for detachably holding said fork in engagement with said attaching device, substantially as set forth.

5. A detachable scraper for forks comprising a scraper blade, a substantially U-shaped attaching device secured to said blade and having outer and intermediate cross-bars between which the tines of the fork are adapted to be inserted, and supporting legs which are adapted to engage the outermost tines inserted between said cross-bars to prevent lateral movement of the fork relative to the scraper blade, a bearing member secured to the scraper blade and adapted to engage the end portions of the tines to prevent them from being swung out of engagement with said cross-bars, and a spring secured at one end to said blade and having a detachable connection at its opposite end which is adapted to engage the fork for holding it in position in said attaching device, substantially as set forth.

Witness my hand, this 20th day of November, 1911.

JAMES T. MACK.

Witnesses:
EDWARD C. HARD,
CYESTA B. HORNBECK.